United States Patent
Hong et al.

(10) Patent No.: US 10,363,554 B2
(45) Date of Patent: Jul. 30, 2019

(54) METHOD FOR REGENERATING CATALYST

(71) Applicant: GEESCO CO., LTD., Yongin-si, Gyeonggi-do (KR)

(72) Inventors: Sung-Ho Hong, Seoul (KR); Tae-Yong Shin, Suwon-si (KR); Jeong Hwa Lee, Gangneung-si (KR); Sang Duck Seo, Incheon (KR)

(73) Assignee: GEESCO CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/573,128

(22) PCT Filed: Apr. 1, 2016

(86) PCT No.: PCT/KR2016/003410
§ 371 (c)(1),
(2) Date: Jan. 12, 2018

(87) PCT Pub. No.: WO2016/182204
PCT Pub. Date: Nov. 17, 2016

(65) Prior Publication Data
US 2018/0141034 A1    May 24, 2018

(30) Foreign Application Priority Data
May 12, 2015 (KR) .................. 10-2015-0066238

(51) Int. Cl.
*B01J 38/06* (2006.01)
*B01J 38/04* (2006.01)
(Continued)

(52) U.S. Cl.
CPC .......... *B01J 38/06* (2013.01); *B01D 53/8628* (2013.01); *B01D 53/96* (2013.01); *B01J 35/04* (2013.01);
(Continued)

(58) Field of Classification Search
CPC ......... B01D 2257/302; B01D 2257/404; B01J 38/06; B01J 38/04
See application file for complete search history.

(56) References Cited

U.S. PATENT DOCUMENTS

| | | |
|---|---|---|
| 2011/0207597 A1 | 8/2011 | Tembaak et al. |
| 2014/0274661 A1 | 9/2014 | Barnard, V et al. |
| 2017/0016686 A1 | 1/2017 | Kim et al. |

FOREIGN PATENT DOCUMENTS

| | | |
|---|---|---|
| JP | 56-136645 A | 10/1981 |
| JP | 2003-047862 A | 2/2003 |

(Continued)

OTHER PUBLICATIONS

International Search Report from corresponding International Patent Application No. PCT/KR2016/003410, dated Jun. 28, 2016.
(Continued)

*Primary Examiner* — Amber R Orlando
*Assistant Examiner* — Syed T Iqbal
(74) *Attorney, Agent, or Firm* — Merchant & Gould P.C.

(57) ABSTRACT

The present invention relates to a method for regenerating a catalyst that can effectively remove a poison bound to a catalyst without chemical injury while minimizing the loss of catalytically active components through a process with improved efficiency, whereby the regenerated catalyst may exhibit excellent denitrification performance.

12 Claims, 9 Drawing Sheets

(51) Int. Cl.
*B01J 35/04* (2006.01)
*B01D 53/86* (2006.01)
*B01D 53/96* (2006.01)

(52) U.S. Cl.
CPC ..... *B01J 38/04* (2013.01); *B01D 2255/20707* (2013.01); *B01D 2255/20723* (2013.01); *B01D 2255/20776* (2013.01); *B01D 2257/302* (2013.01); *B01D 2257/404* (2013.01)

(56) References Cited

FOREIGN PATENT DOCUMENTS

| | | | |
|---|---|---|---|
| JP | 2014-512955 A | 5/2014 | |
| KR | 10-1024845 B1 | 3/2011 | |
| KR | 101024845 B1 * | 3/2011 | |
| KR | 10-2013-0072722 A | 7/2013 | |
| KR | 10-2014-0011397 A | 1/2014 | |
| KR | 10-1387024 B1 | 4/2014 | |
| KR | 101387024 B1 * | 4/2014 | ............. F28G 9/005 |
| KR | 10-2014-0140249 A | 12/2014 | |
| WO | 2010/027617 A1 | 3/2010 | |

OTHER PUBLICATIONS

Written Opinion from corresponding International Patent Application No. PCT/KR2016/003410, dated Jun. 28, 2016.
European Search Report from European Application No. 16792850.6, dated Dec. 5, 2018.

* cited by examiner

METHOD FOR REGENERATING CATALYST

CROSS-REFERENCE TO RELATED APPLICATION

This application is a National Stage Application of International Patent Application No. PCT/KR2016/003410, filed Apr. 1, 2016, which claims the benefit of Korean Patent Application No. 10-2015-0066238 filed on May 12, 2015 with the Korean Intellectual Property Office, the disclosures of which are incorporated herein by reference in their entirety. To the extent appropriate, a claim of priority is made to each of the above disclosed applications.

TECHNICAL FIELD OF THE INVENTION

The present invention relates to a method for regenerating a catalyst. More specifically, the present invention relates to a method for regenerating a catalyst that can effectively remove a poison bound to a catalyst without chemical injury, while minimizing the loss of catalytically active components, through a process with improved efficiency, whereby the regenerated catalyst may exhibit excellent denitrification performance.

BACKGROUND OF THE INVENTION

When a fossil fuel such as coal, petroleum, natural gas, etc., or waste is combusted, nitrogen oxides ($NO_x$) are included in the exhaust gas, and such nitrogen oxides are a pollutant that becomes a main cause of air pollution, and thus necessarily should be removed before being discharged into the atmosphere.

For example, currently, selective catalytic reduction (SCR) is being widely used so as to remove nitrogen oxides included in exhaust gas. The selective catalytic reduction is a method of spraying ammonia or urea at the front end of a selective catalytic reduction (SCR) catalyst to induce the following chemical reaction, thus passing nitrogen oxides in exhaust gas through the catalyst together with ammonia and converting them into non-hazardous water and nitrogen.

$$4NO + 4NH_3 + O_2 \rightarrow 4N_2 + 6H_2O \quad (1)$$

In general, when coal or heavy oil is combusted in a boiler, sulfur dioxide ($SO_2$) and sulfur trioxide ($SO_3$) are generated, and among them, sulfur dioxide is partially oxidized into sulfur trioxide when passing through the selective catalytic reduction (SCR) catalyst as follows, and thus, when SCR denitrification facilities are installed, a total concentration of sulfur trioxide in the exhaust gas increases. Since the increase in sulfur trioxide impairs facilities at the back end of the SCR catalyst, the conversion rate of $SO_2$ into $SO_3$ is limited to within 1%, and recently, when the concentration of sulfur (S) in fuel is high, the conversion rate into $SO_3$ has been limited to within 0.7%.

$$2SO_2 + O_2 \rightarrow 2SO_3 \quad (2)$$

Moisture exists in exhaust gas, and a part of ammonia introduced into the SCR catalyst reacts with sulfur trioxide and water as follows, thus forming ammonium sulfate.

$$NH_3 + SO_3 + H_2O \rightarrow NH_4HSO_4, (NH_4)_2SO_4 \quad (3)$$

Ammonium sulfate is coated on the surface or gap, pores, etc. of a catalyst, to deteriorate catalytic activity. Since the catalyst pores function to increase the surface area where nitrogen oxide and ammonia can react, if the catalyst pores are blocked, catalyst performance may be deteriorated.

If the catalyst surface is thereby poisoned, the poisoned catalyst should be withdrawn from the reactor of denitrification facilities, and the poison of the catalyst should be removed to regenerate the catalyst by chemical treatment or the catalyst should be discarded.

The catalyst regeneration by chemical treatment has disadvantages in that expensive chemical solutions should be used, a high cost is required to treat generated waste water, and during the catalyst generation, moisture penetrates into the catalyst to deteriorate catalyst strength, and catalytically active materials such as $V_2O_5$, etc. are eluted. Further, in the case of the catalyst regeneration by chemical cleaning, the operation of a boiler should be necessarily stopped, thus generating enormous process losses.

In order to overcome the above-described problems, the present inventors have suggested a technology for solving catalyst poisoning by pollutants such as ammonium sulfate, etc. by installing a dry ice fine particle spray device at the front end of a catalyst inlet, in Korean Patent No. 10-1024845.

However, although catalyst regeneration is easily achieved with only the dry ice fine particle spray technology when only ammonium sulfate exists as a poison, when catalyst poisoning by particles such as uncombusted carbon, etc. increases due to the use of low quality fuel, a significant number of catalyst holes are blocked by uncombusted carbon powder and ammonium sulfate, and thus, when dry ice fine particles are sprayed, the fine particles flow back, thereby deteriorating the catalyst regeneration effect.

Also, when an alkali metal such as Na, K, etc. and $P_2O_5$, etc. are included in coal, heavy oil, or biofuel, it has been substantially technically difficult to completely remove catalyst poisons by only using a cleaning technology using dry ice fine particle spraying.

Thus, there is demand for the development of a catalyst regeneration method that can exhibit improved catalyst poison removal force, and that can exhibit denitrification performance equivalent to the initial catalyst.

(PATENT DOCUMENT 1) Korean Registered Patent No. 10-1024845 (Registration date: Mar. 18, 2011)

SUMMARY OF THE INVENTION

It is an object of the present invention to provide a method for regenerating a catalyst that can effectively remove a poison bound to a catalyst without chemical injury while minimizing the loss of catalytically active components through a process with improved efficiency, whereby the regenerated catalyst may exhibit excellent denitrification performance.

A method for regenerating a catalyst including spraying steam to a spent catalyst, and spraying dry ice particles to the spent catalyst, is provided herein.

DESCRIPTION OF SYMBOLS

Figure 1:
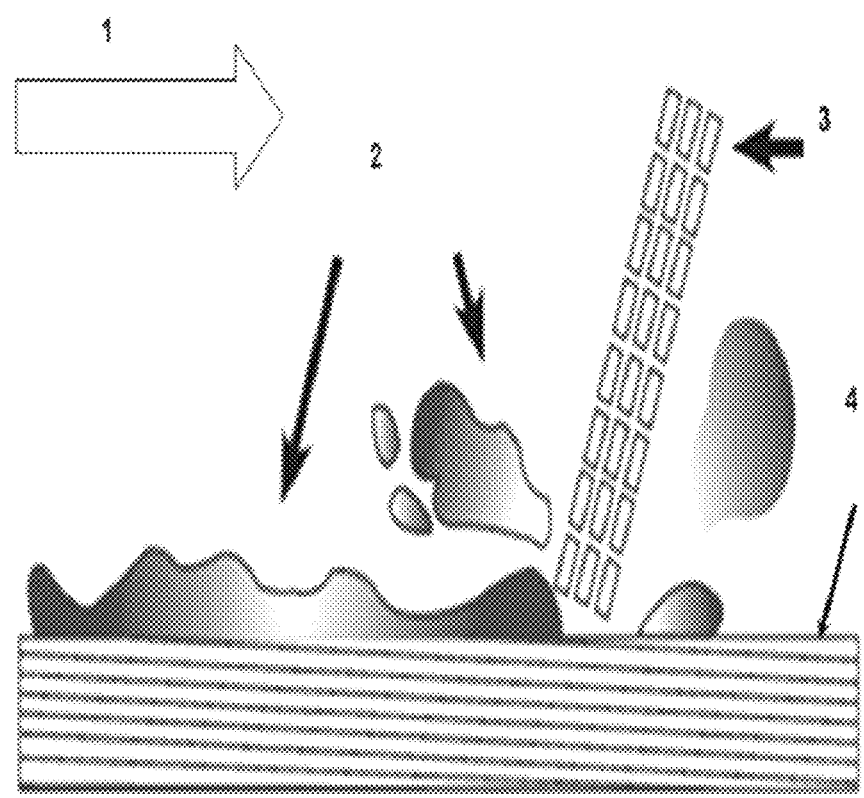
FIG. 1 schematically shows a principle by which dry ice particles remove poison.

1: exhaust gas direction, 2: poison, 3: dry ice fine particles, 4: catalyst surface, 5: exhaust gas mixture of ammonia and nitrogen oxide, 6: exhaust gas guide vein, 7: high temperature steam supply pipe, 8: dry ice fine particle spray pipe, 9: dry ice fine particles, 10: catalyst layer, 11: dry ice fine particle spray device, 12: dry ice fine particle supply device, 13: dry ice spray device controller, 14: ammonia measuring instrument or differential pressure gauge

DETAILED DESCRIPTION OF THE INVENTION

Hereinafter, a method for regenerating a catalyst according to specific embodiments of the present invention will be explained in detail.

According to one embodiment of the invention, a method for regenerating a catalyst including spraying steam to a spent catalyst, and spraying dry ice particles to the spent catalyst, is provided.

The present inventors confirmed through experiments that if the above-explained catalyst regeneration method is used, by spraying dry ice particles together with high temperature steam, a capability of removing poison from a spent catalyst may be largely improved compared to the existing method of spraying dry ice particles only, and completed the present invention.

In the case of the existing catalyst regeneration method wherein dry ice fine particles are sprayed, while a significant number of the holes of a catalyst are blocked by a layer of a poison such as dust, etc., dry ice fine particles cannot penetrate inside a catalyst but flow backward, and thus it is difficult to effectively remove poisons bound to the pores inside a catalyst.

To the contrary, in the catalyst regeneration method according to one embodiment of the present invention, by spraying steam to a spent catalyst, while high temperature steam is adsorbed to poison or dust and thus a liquid material is dispersed on the surface of the spent catalyst, low temperature dry ice particles are collided, thereby rapidly freezing the liquid material.

As such, by dispersing a liquid material on the surface of the spent catalyst, poisons formed on the surface of the spent catalyst shrink by a temperature difference with the surroundings and may cause numerous cracks.

Meanwhile, the dry ice particles are ground to particles of a minute size while colliding with the spent catalyst at a high speed, and thus can easily penetrate inside the cracks generated in the poisons, and the volume is expanded by 800 times or more while being sublimed inside the cracks of the poisons, thereby removing the poisons from the catalyst.

That is, by spraying dry ice particles together with or after steam spraying, through the freezing of a liquefied steam on the surface of a spent catalyst, cracks may be generated more rapidly and easily on the poisons. Thus, the dry ice particles may penetrate into the gaps or pores scattered on the surface of a catalyst without flowing backward, thereby effectively removing poisons.

As such, as the penetration of dry ice particles easily occurs by the spraying of high temperature steam, by controlling the spray speed and spray amount of dry ice particles to optimum levels, physical damage due to the physical collision with the surface of a catalyst can be minimized.

Further, in the catalyst regeneration method of one embodiment, since most poisons existing in the catalyst can be removed simply by combined cleaning wherein dry ice particles are sprayed together with high temperature steam, chemical treatment such as with an acid solution, an alkali solution, etc. is not required.

Thus, the elution of the active material of a catalyst such as vanadium (V), tungsten (W), molybdenum (Mo), etc. can be minimized, and thus a process of additionally supporting an active material so as to recover catalyst performance can be omitted. In addition, since the combined cleaning process can be performed in real time during the operation of equipment equipped with denitrification facilities, the efficiency of the catalyst regeneration process can be improved.

Furthermore, in the combined cleaning process, since the elution of the active material of a catalyst such as vanadium (V), tungsten (W), molybdenum (Mo), etc. is minimized while removing poisons bound to a catalyst, the regenerated catalyst may exhibit excellent denitrification performance equivalent to a new catalyst. In addition, since there is no contact of chemicals on the surface of a catalyst, chemical injury on the surface of a catalyst can also be prevented.

Specifically, the method for regenerating a catalyst may include spraying steam to a spent catalyst. In the spraying of steam to a spent catalyst, the sprayed steam contacts the surface of the spent catalyst and is liquefied, and may be dispersed in the form of a liquid material.

The spent catalyst may include a catalyst and poisons formed on the surface of the catalyst. The form of the catalyst is not particularly limited, and for example, it may have a honeycomb shape, a plate shape, a corrugated shape, etc. The size of a gap or pores of the catalyst is generally 0.02 μm to 2 μm, and in the case of the honeycomb-shaped catalyst, the size of the honeycomb hole may be approximately 3 mm to 10 mm.

The poison means a material that impairs the activity and selectivity of a catalyst, and the poison may bind to the gap or pores scattered on the surface of a catalyst to decrease the catalytic activity. Examples of the poison are not particularly limited, and for example, it may include ammonium sulfate, dust, metal oxides, alkali metal salts, phosphorous compounds, sulfur oxides, or mixtures of two or more kinds thereof. Examples of the metal oxides may include sodium oxide ($Na_2O$), iron oxide ($Fe_2O_3$), calcium oxide (CaO), magnesium oxide (MgO), potassium oxide ($K_2O$), etc., examples of the phosphorous compound may include phosphorous pentoxide ($P_2O_5$), etc., and examples of the sulfur oxide may include sulfur trioxide ($SO_3$).

Particularly, the method for regenerating a catalyst according to one embodiment not only removes poisons bound to a spent catalyst, but also minimizes physical or chemical damage of the surface of the catalyst, and thus the regenerated catalyst can realize excellent catalytic performance, and there is an advantage in terms of process efficiency in that all the processes can be performed in real time during the operation of equipment equipped with a catalyst.

More specifically, specific kinds of the catalyst included in the spent catalyst are not particularly limited, and for example, may include selective catalytic reduction (SCR) catalysts, automobile catalysts, petroleum refining catalysts, petrochemical preparation catalysts, desulfurization catalysts, etc.

Specifically, the selective catalytic reduction (SCR) catalyst is a catalyst used for selective catalytic reduction (SCR) for removing nitrogen oxides included in exhaust gas. The selective catalytic reduction is a method of spraying ammonia or urea at the front end of a selective catalytic reduction (SCR) catalyst to pass nitrogen oxides in the exhaust gas through the catalyst together with ammonia and convert them into non-hazardous water and nitrogen through the chemical reaction.

The term "steam" means a gaseous state of a liquid or solid material at room temperature, and although examples of the steam are not particularly limited, they may include water vapor, ethanol aqueous solution steam, dilute sulfuric acid aqueous solution steam, etc., as examples.

The temperature of the sprayed steam may be 100° C. to 500° C., or 200° C. to 400° C. Among the above-explained poisons, for example, ammonium sulfate is decomposed by heat at a temperature of 350° C. or more, and thus if the temperature of the sprayed steam increases, it may become easy to remove poison. And, if using the steam of the above temperature range, even if a poison is not decomposed by heat, binding strength between poisons may decrease, and the penetration of dry ice may become easy.

Figure 2:
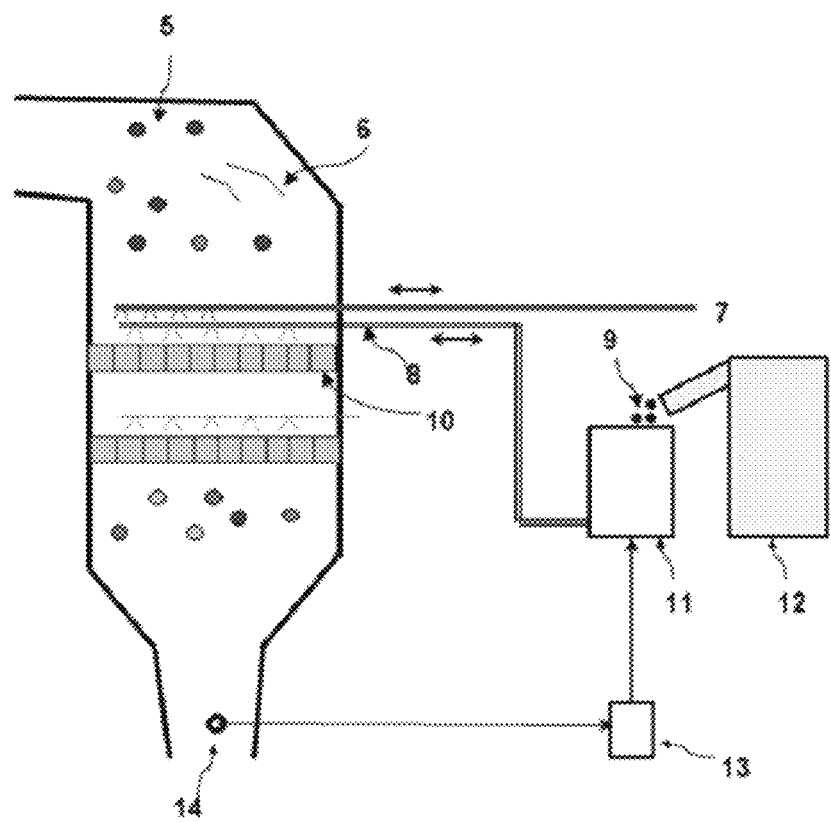
FIG. 2 is a schematic diagram of a removal system for removal of ammonium sulfate from a catalyst layer in denitrification facilities equipped with a dry ice cleaning device.

The steam may be sprayed at the front end of a spent catalyst. As explained above, the method of regenerating a catalyst according to one embodiment may be performed during the operation of equipment equipped with a catalyst, and specifically, as shown in FIG. 2, it may be performed in a catalyst reactor equipped with a catalyst (10). Here, the steam may be sprayed through a steam supply pipe (7) positioned at the front end of the catalyst (10).

The sprayed steam may contact 70% or more, or 90% or more, of the surface of the spent catalyst. Further, the temperature of the surface of the spent catalyst may be 25° C. to 50° C. Thus, the high temperature steam may be liquefied immediately after contacting the surface of the spent catalyst, and the liquid material may be sprayed over a wide range of 70% or more, or 90% or more, of the surface of the spent catalyst.

The liquid material may include poison to which the liquefied product of steam or steam is adsorbed. As explained above, if the steam contacts the surface of the spent catalyst, it may be liquefied due to the temperature difference, and may be dispersed on the surface of the spent catalyst as liquid state material. As explained above, since the examples of the steam may include water vapor, ethanol aqueous solution steam, and dilute sulfuric acid aqueous solution steam, the examples of the liquid material may include water, ethanol, dilute sulfuric acid, etc.

The amount of the steam sprayed on the surface of the spent catalyst may be 300 cc/min to 1200 cc/min.

Although the examples of the spray method of steam are not particularly limited, for example, it may be sprayed using a nozzle, as shown in FIG. 2. In the spray process using a nozzle, the steam may be sprayed at a pressure of 1 kg/cm² to 100 kg/cm², 5 kg/cm² to 50 kg/cm², or 10 kg/cm² to 30 kg/cm².

The method for regenerating a catalyst may also include spraying dry ice particles to the spent catalyst. By spraying the dry ice particles, the liquid material dispersed on the surface of the spent catalyst may be rapidly frozen to cause cracks on the poison layer, and the fine dry ice particles may penetrate inside the cracks, thus removing poisons, as described below.

The spraying of steam on the surface of the spent catalyst and the spraying of dry ice particles to the spent catalyst may be performed simultaneously or sequentially.

The dry ice may be sprayed on the front end of the spent catalyst. As explained above, the method for regenerating a catalyst according to one embodiment may be performed during the operation of equipment equipped with a catalyst, and specifically, it may be performed in a catalyst reactor equipped with a catalyst (10). Here, the dry ice may be sprayed through a dry ice supply pipe (8) positioned at the front end of the catalyst (10).

The sprayed dry ice may contact 70% or more, or 90% or more, of the surface of the spent catalyst. Thus, through the freezing by dry ice, a significant number of poisons bound to the surface of the spent catalyst may be effectively removed, as described below.

In the spraying of dry ice particles to the spent catalyst, a liquid material dispersed on the surface of the spent catalyst may be frozen. The freezing means a phenomenon wherein the liquid material is cooled, the temperature reaches a solidifying point, and the material is crystallized, and as explained above, by spraying dry ice particles to the spent catalyst, while the dry ice particles collide with the surface of the spent catalyst, the temperature around the liquid material sprayed on the surface of the spent catalyst may be lowered to −78.5° C. to 0° C.

The freezing of the liquid material sprayed on the surface of the spent catalyst may be performed for 1 s or less, or 0.001 s to 1 s. As such, as the freezing of liquid material is rapidly performed, the efficiency of the catalyst regeneration process may be improved.

When the liquid material dispersed on the surface of the spent catalyst is frozen, cracks may be formed on the poison included in the spent catalyst. Due to the cracks formed on the poison, the sprayed dry ice particles may easily penetrate inside the poison.

The mean particle diameter of the cracks may be 0.1 μm to 50 μm.

As a specific example of the formation of cracks on the poison included in the spent catalyst, as shown in FIG. 1, while dry ice particles (9) are sprayed with high pressure air at a high speed and collide with the surface of the catalyst (10), a poison (8) such as ammonium sulfate attached to the surface of the catalyst (10) may be rapidly frozen to an ultralow temperature (−78° C.), and shrunken by a temperature difference from the surroundings to cause numerous cracks.

The dry ice particles may be sprayed to the surface of the catalyst in parallel. Thus, poison removal efficiency on the catalyst surface and at the gap or pores formed on the catalyst surface may be improved. Specifically, as shown in FIG. 1, while the dry ice particles (3) move in a direction parallel to the catalyst surface (4), they may remove a poison (2) on the catalyst surface.

The dry ice particles may have a diameter of 0.1 mm to 3 mm.

The dry ice particles may be sprayed at a speed of 100 m/s to 500 m/s, or 200 m/s to 400 m/s. For this, at the time of spraying of the dry ice particles, spraying may be performed by high pressure air at 0.1 30 kg/cm$^2$ to 100 kg/cm$^2$, or 0.5 kg/cm$^2$ to 20 kg/cm$^2$.

Thus, while the dry ice particles collide with the surface of the spent catalyst at a high speed, they may be ground to particles of a minute size, and may penetrate inside the spent catalyst in the form of fine particles. If the spray speed of the dry ice particles excessively increases, due to the impact at the time of collision with the catalyst surface, physical damage may be generated on the catalyst.

The spray amount of the dry ice particles may be 0.5 kg/min to 2.5 kg/min.

Although examples of the spray method of dry ice particles are not particularly limited, for example, they may be sprayed using a nozzle, as shown in FIG. 2. In the spray process using a nozzle, the dry ice particles may be sprayed at a distance of 0.1 m to 2 m, or 0.1 m to 1 m, from the spent catalyst.

Meanwhile, in the spraying of dry ice particles to the spent catalyst, due to the high speed collision of the dry ice particles with the surface of the spent catalyst, fine dry ice particles with a particle diameter of 0.1 μm to 100 μm may be formed. Due to the formation of the fine dry ice particles, the fine dry ice particles may easily penetrate inside the poison of the spent catalyst, and thus poison removal efficiency may be improved.

The method of regenerating a catalyst may further include removing a poison included in the spent catalyst by dry ice particles, after the spraying of dry ice particles to the spent catalyst. Through the removal of the poison included in the spent catalyst, the spent catalyst may be regenerated.

The removing of the poison included in the spent catalyst by dry ice particles may include penetrating dry ice particles inside the poison, and sublimating the dry ice particles.

In the penetrating of the dry ice particles inside the poison, the dry ice particles may include fine particles with a particle diameter of 0.1 μm to 100 μm formed due to the high speed collision resulting from the spraying of the dry ice particles to the spent catalyst.

The dry ice particles may penetrate inside the poison through the cracks formed on the poison due to the spraying of the dry ice particles.

In the sublimation of the dry ice particles, while the dry ice particles are sublimed, due to the volume expansion inside the poison, the poison may be separated from the spent catalyst. Further, the separated poison may move to the back end of the catalyst according to the flow of exhaust gas or steam in the spent catalyst, and be removed.

The spraying of dry ice particles to the spent catalyst may further include spraying ice with a particle diameter or 0.1 mm to 5 mm. The spraying of ice may be performed simultaneously or sequentially with the spraying of dry ice particles.

As such, if the spraying of ice is performed together with the spraying of dry ice particles, due to the physical collision of ice, cracks may be generated on the poison bound to the gap or hole of the catalyst, thereby increasing the penetration force of dry ice and further improving poison removal capability.

The ice with a particle diameter of 0.1 mm to 5 mm, or 0.1 mm to 3 mm, may be sprayed in parallel to the surface of the catalyst. The ice may be sprayed at a pressure of 0.5 kg/cm$^2$ to 20 kg/cm$^2$, and thus may be sprayed at a speed of 200 m/s to 400 m/s.

If the diameter of the ice is too small or the spray speed becomes too slow, it may be difficult to sufficiently realize the poison removal effect by the ice. To the contrary, if the diameter of the ice is too large or the spray speed becomes too fast, physical damage may be generated on the surface of the catalyst.

In the method for regenerating a catalyst according to one embodiment, a decrease rate of the weight ratio of the poison to active components before and after the regeneration, according to the following Equation 1, may be 30% to 90%, 40% to 80%, or 50% to 80%.

Decrease rate of the weight ratio of poison to active components before and after regeneration (%)= (the weight ratio of poison to active component before regeneration–the weight ratio of poison to active component after regeneration)/the weight ratio of poison to active component before regeneration*100.   [Equation1]

Specifically, the weight ratio of poison to active component is a value obtained by dividing the content of poison in the catalyst by the content of active component, and if the number of the poisons is 2 or more, the content of the poison means the sum of the contents of all the poisons, while if the number of the active components is 2 or more, the content of the active component means the sum of the contents of all the active components.

In Equation 1, the active component included in the catalyst means a component capable of realizing a function as a catalyst, and for example, the active component may include tungsten (W), vanadium (V), and molybdenum (Mo).

In Equation 1, examples of the poison included in the catalyst may include sodium oxide ($Na_2O$), iron oxide ($Fe_2O_3$), calcium oxide (CaO), magnesium oxide (MgO), potassium oxide ($K_2O$), sulfur trioxide ($SO_3$), and phosphorus pentoxide ($P_2O_5$).

If the decrease rate of the weight ratio of the poison to the active component before and after catalyst regeneration increases, it means that the relative ratio of the poison based on the active component after the catalyst regeneration decreases compared to that before the catalyst regeneration. It can be seen from this that as the decrease rate value of the weight ratio of the poison to the active component before and after regeneration according to Equation 1 is larger, the poison is effectively removed by the catalyst regeneration, and the loss of active component is minimized.

The method of regenerating a catalyst according to one embodiment exhibits a decrease rate of the weight ratio of the poison to the active component before and after regeneration, according to Equation 1, of 30% or more, thus confirming that the poison can be effectively removed while preventing the loss of catalytically active component.

The method of regenerating a catalyst may further include detecting the degree of poisoning in real time and controlling the amount of spray, before the spraying of steam to a spent catalyst. Thereby, the spray amount of dry ice particles or steam may be automatically controlled, and thus catalyst regeneration may progress in real time even during the operation of a combustion apparatus or facilities such as a boiler, etc.

The degree of poisoning of the catalyst may be detected by measuring an ammonia slip amount or pressure change of the catalyst, for example. The ammonia slip means a phenomenon wherein surplus ammonia that has not participated in the reaction during a selective catalytic reduction (SCR) process is discharged into exhaust gas.

A specific example of the detecting of the degree of poisoning in real time and controlling the amount of spray will be explained with reference to FIG. 2. When the ammonia slip amount is measured using an ammonia measuring instrument installed at the back end of the catalyst, if the ammonia slip amount increases beyond a certain concentration, for example, increases by 1 ppm or more, the spray amount of a dry ice fine particle spray device (11) may be controlled through a dry ice spray device controller (13).

According to the present invention, a method for regenerating a catalyst that can effectively remove a poison bound to a catalyst without chemical injury while minimizing the loss of catalytically active components through a process with improved efficiency, whereby the regenerated catalyst may exhibit excellent denitrification performance, is provided.

Hereinafter, the present disclosure will be explained in detail with reference to the following examples. However, these examples are only to illustrate the inventive concept, and the scope of the inventive concept is not limited thereto.

Examples 1 to 7: Catalyst Regeneration Method

Figure 3:
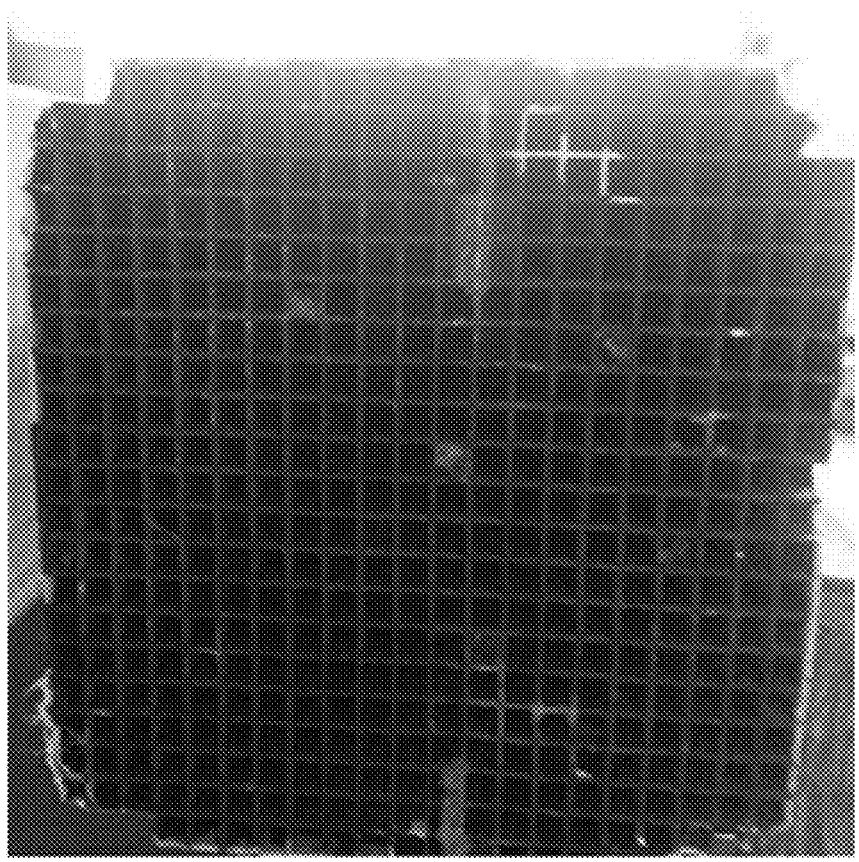
FIG. 3 shows the appearance of a honeycomb-shaped selective catalytic reduction (SCR) catalyst that is poisoned in a power plant using Orimulsion heavy oil as a fuel, before regeneration.

Example 1: Regeneration of Honeycomb-Shaped Catalyst Poisoned with Dust and Ammonium Sulfate From denitrification facilities installed at the back end of a boiler of a thermal power plant using a high-sulfur fuel and Orimulsion heavy oil, a honeycomb-shaped selective catalytic reduction (SCR) catalyst of 150 mm×150 mm×650 mm poisoned with dust and ammonium sulfate as shown in FIG. 3, was withdrawn.

A high temperature steam at about 200° C. was sprayed to the honeycomb-shaped selective catalytic reduction (SCR) catalyst, and dry ice fine particles were sprayed at about 1.5 kg/min for about 2 min at a pressure of about 5 kg/cm$^2$ using a spray nozzle with a hole size of about 70 mm, while maintaining a distance between the nozzle and the selective catalytic reduction (SCR) catalyst at about 0.9 m. At this time, the spray nozzle uniformly sprayed dry ice fine particles to the poisoned side of the selective catalytic reduction (SCR) catalyst while moving left and right, and up and down.

Figure 4:
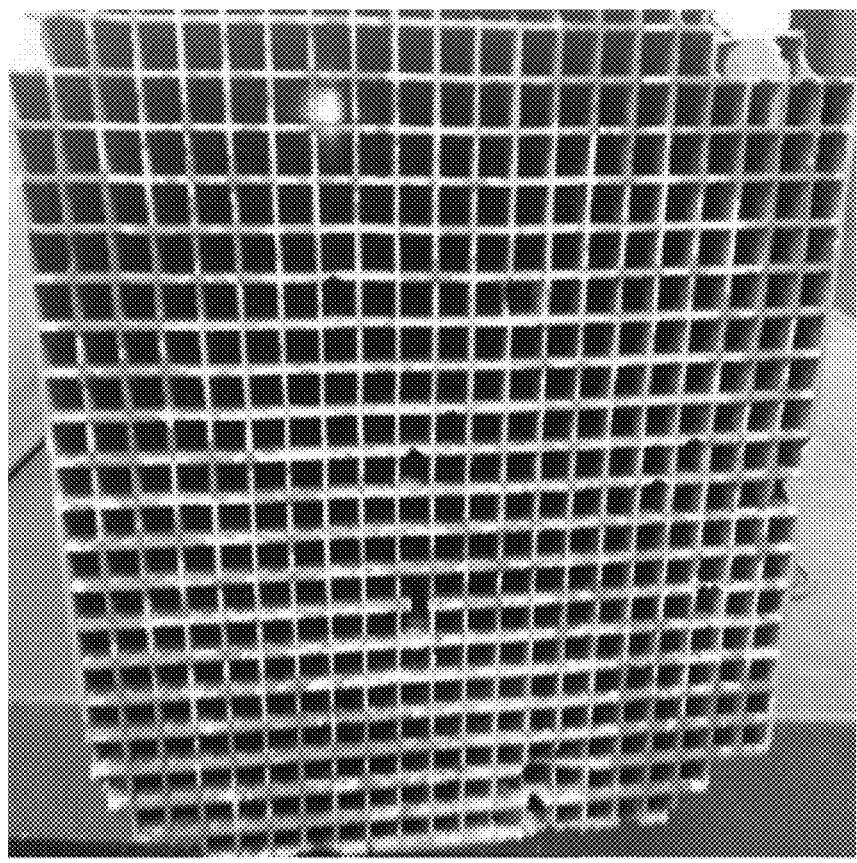
FIG. 4 shows the appearance of a honeycomb-shaped selective catalytic reduction (SCR) catalyst that is poisoned in a power plant using Orimulsion heavy oil as fuel, after regeneration.

The appearance of the finally regenerated catalyst is as shown in FIG. 4. The denitrification performance test before and after catalyst regeneration was conducted under the conditions as described in Table 1, and the catalyst regeneration results are as described in Table 2.

TABLE 1

Conditions for measuring denitrification efficiency of honeycomb-shaped catalyst poisoned with dust and ammonium sulfate

| | Conditions |
|---|---|
| Temperature (° C.) | 312 |
| Space velocity (h$^{-1}$) | 8474 |

TABLE 2

Denitrification efficiency change before/after regeneration of honeycomb-shaped catalyst poisoned with dust and ammonium sulfate

| | | NO$_x$ concentration (ppm) | | NH$_3$ Slip amount | O$_2$ concentration | Denitrification |
|---|---|---|---|---|---|---|
| | | Inlet | Outlet | (ppm) | (%) | efficiency (%) |
| New catalyst | | 293.1 | 33.0 | 2 | 17.91 | 88.7 |
| Catalyst regeneration | Before | 287.3 | 89.95 | 2 | 17.15 | 68.7 |
| | After | 293.0 | 33.9 | 2 | 17.63 | 88.4 |

As shown in Table 2, it is confirmed that, after catalyst regeneration, denitrification efficiency was recovered to a level equivalent to a new catalyst.

Figure 5:
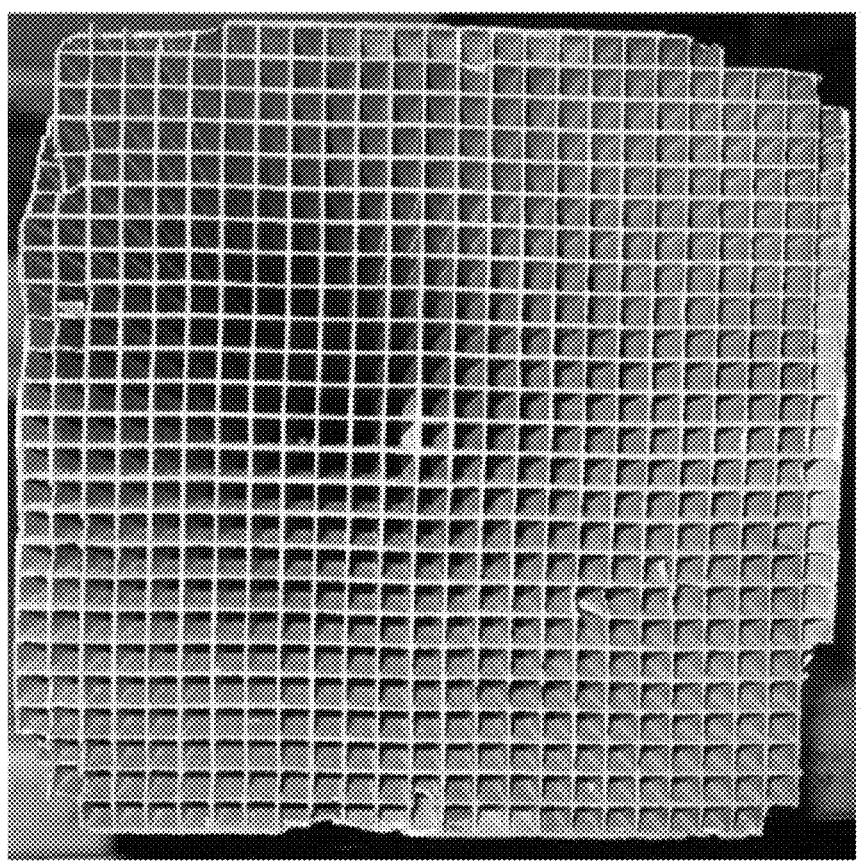
FIG. 5 shows the appearance of a honeycomb-shaped selective catalytic reduction (SCR) catalyst of a power plant where heavy oil containing a high concentration of phosphorus (P) is combusted, after regeneration.

Example 2: Regeneration of Honeycomb-Shaped Catalyst Poisoned with Phosphorus Compound or Alkali Metal Honeycomb-shaped selective catalytic reduction (SCR) catalysts of 150 mm×150 mm×920 mm respectively poisoned with a phosphorus compound or alkali metal were withdrawn from two reactors (respectively designated as A reactor and B reactor) included in denitrification facilities installed in a boiler of an oil fired power plant using high-sulfur fuel containing a large amount of phosphorus (P), and the catalysts were regenerated by the same method as Example 1. The appearance after the final regeneration is as shown in FIG. 5.

The denitrification performance test before and after catalyst regeneration was conducted under the conditions as described in Table 3, and the catalyst regeneration results are as described in Table 4.

TABLE 3

The conditions for measuring denitrification efficiency of honeycomb-shaped catalyst poisoned with a phosphorus compound or alkali metal

| | Unit | Numerical value |
|---|---|---|
| Flow rate | Nm$^3$/h | 123.0~125.0 |
| Catalyst volume | m$^3$ | 0.0207 |
| Space velocity | h$^{-1}$ | 6000 |
| Temperature | ° C. | 346 |

TABLE 4

Comparison of denitrification efficiencies of honeycomb-shaped selective catalytic reduction (SCR) catalyst poisoned with a phosphorus compound or alkali metal, after regeneration

| | | Inlet $NO_x$ concentration | Outlet $NO_x$ concentration | $NH_3$ slip | Denitrification efficiency (%) |
|---|---|---|---|---|---|
| New catalyst | | 258.53 | 50.6 | 2 | 80.4 |
| A reactor catalyst | Before cleaning | 232.7 | 106.8 | 2 | 54.1 |
| | After cleaning | 248.4 | | 2 | 67.6 |
| B reactor catalyst | Before cleaning | 223.63 | 102.63 | 4 | 53.6 |
| | After cleaning | 234.58 | 64.1 | 4 | 72.7 |

As shown in Table 4, it can be seen that catalyst performance was regenerated by 80% or more, after cleaning.

Figure 6:
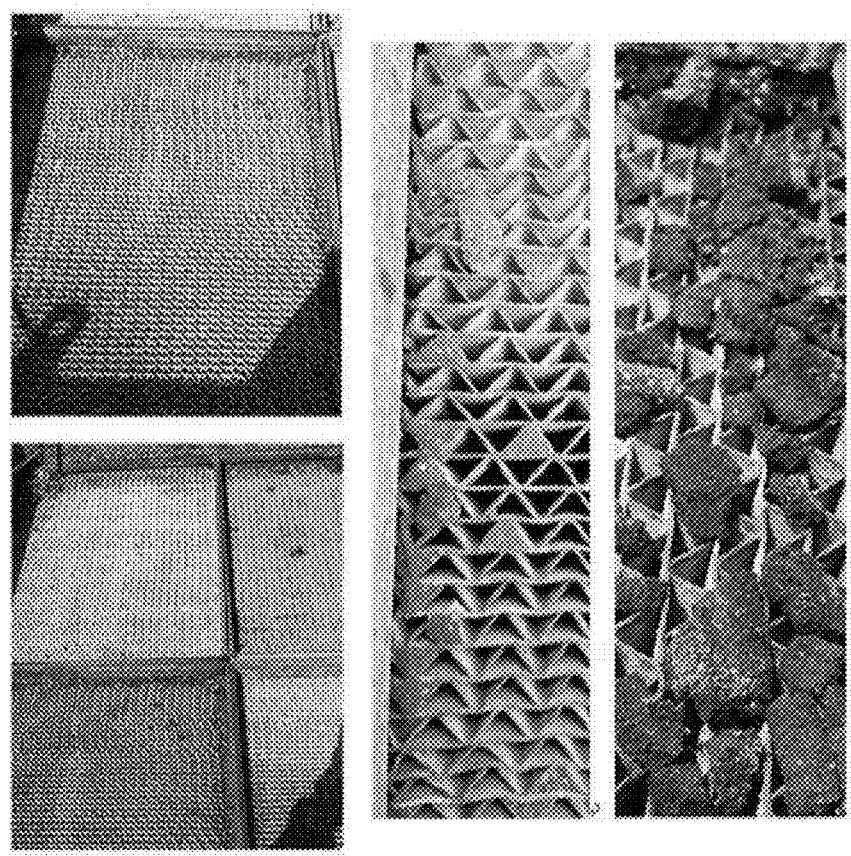
FIG. 6 shows the appearance of a corrugated selective catalytic reduction (SCR) catalyst of a power plant where heavy oil containing a high concentration of phosphorus (P) is combusted, before regeneration.
Figure 7:
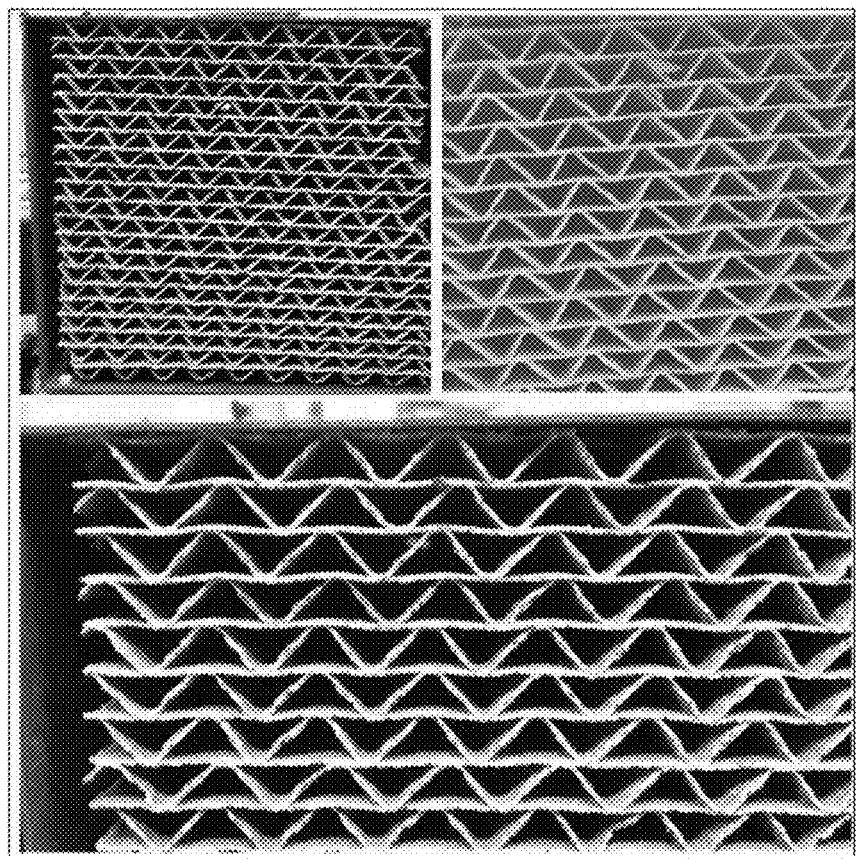
FIG. 7 shows the appearance of a corrugated selective catalytic reduction (SCR) catalyst of a power plant where heavy oil containing a high concentration of phosphorus (P) is combusted, after regeneration.

Example 3: Regeneration of Corrugated Catalyst Poisoned with Phosphorus Compound or Alkali Metal A corrugated selective catalytic reduction (SCR) catalyst of 450 mm×450 mm×550 mm poisoned with a phosphorus compound or alkali metal as shown in FIG. 6 was withdrawn from denitrification facilities installed in a boiler of a thermal power plant using high-sulfur fuel containing a large amount of phosphorus (P) and biomass heavy oil, and the catalyst was regenerated by the same method as Example 1. The appearance of the catalyst after the final regeneration is as shown in FIG. 7.

The denitrification performance test before and after catalyst regeneration was conducted under the conditions as described in Table 5, and the catalyst regeneration results are as described in Table 6. Further, the results of XRF analysis of the material on the catalyst surface before and after regeneration are as described in Table 7.

TABLE 5

Conditions for measuring denitrification efficiency of corrugated catalyst poisoned with a phosphorus compound or alkali metal

| | Conditions |
|---|---|
| Temperature (° C.) | 312 |
| Space velocity ($h^{-1}$) | 8474 |
| $NH_3/NO_x$ ratio | 0.20~0.6 |

TABLE 6

Comparison of denitrification efficiencies of corrugated selective catalytic reduction (SCR) catalyst poisoned with a phosphorus compound or alkali metal, after regeneration

| | $NO_x$ concentration (ppm) | | $NH_3$ slip (ppm) | $O_2$ concentration (%) | Denitrification efficiency (%) |
|---|---|---|---|---|---|
| | Inlet | Outlet | | | |
| New catalyst | 251 | 90 | 2 | 21 | 64.1 |
| Before cleaning | 279 | 214 | 4 | 17.25 | 23.3 |
| After secondary cleaning | 269 | 119 | 5 | 17.27 | 55.7 |

As shown in Table 6, it can be seen that denitrification efficiency was recovered by 80% or more by catalyst regeneration.

TABLE 7

XRF analysis results of the compositions of corrugated selective catalytic reduction (SCR) catalyst poisoned with a phosphorus compound or alkali metal, before and after catalyst regeneration
(unit: wt %)

| Component | New catalyst | Before catalyst regeneration | After catalyst regeneration |
|---|---|---|---|
| $TiO_2$ | 91.20 | 69.19 | 79.80 |
| $SO_3$ | 0.22 | 8.16 | 3.19 |
| $WO_3$ | 4.27 | 5.10 | 4.83 |
| $V_2O_5$ | 3.90 | 4.99 | 3.26 |
| CaO | 0.04 | 4.13 | 3.82 |
| $Al_2O_3$ | 0.02 | 2.35 | 2.42 |
| $P_2O_5$ | 0.10 | 1.70 | 0.86 |
| $Na_2O$ | 0.00 | 1.46 | 0.65 |
| MgO | 0.02 | 0.90 | 0.21 |
| $Fe_2O_3$ | 0.06 | 0.55 | 0.22 |
| NiO | 0.00 | 0.38 | 0.09 |
| $MoO_3$ | 0.00 | 0.30 | 0.24 |
| $Nb_2O_5$ | 0.17 | 0.26 | 0.11 |
| ZnO | 0.00 | 0.17 | 0.05 |
| $SeO_2$ | 0.00 | 0.15 | 0.00 |
| SrO | 0.00 | 0.08 | 0.11 |
| $K_2O$ | 0.01 | 0.06 | 0.05 |
| $ZrO_2$ | 0.01 | 0.04 | 0.05 |
| CuO | 0.00 | 0.02 | 0.05 |

As shown in Table 7, in the case of a new catalyst, the weight ratio of main active components ($WO_3$, $V_2O_5$, and $MoO_3$):poisons ($Na_2O$, $Fe_2O_3$, CaO, MgO, $K_2O$, $SO_3$, and $P_2O_5$) is 8.17:0.45 [the weight ratio of poisons to the active components is 0.06], while the weight ratio of main active components ($WO_3$, $V_2O_5$, and $MoO_3$):poisons ($Na_2O$, $Fe_2O_3$, CaO, MgO, $K_2O$, $SO_3$, and $P_2O_5$) before catalyst regeneration is 10.39:16.96 [the weight ratio of poisons to the active components is 1.63], confirming that the catalyst before regeneration contained a relatively large amount of poisons.

Meanwhile, the weight ratio of main active components ($WO_3$, $V_2O_5$, $MoO_3$):poisons ($Na_2O$, $Fe_2O_3$, CaO, MgO, $K_2O$, $SO_3$, and $P_2O_5$) after catalyst regeneration is 8.33:9.00 [the weight ratio of poisons to the active components is 1.08], confirming that the weight ratio of poisons to the active components decreased compared to 1.63, which is the weight ratio of poisons to active components before catalyst regeneration.

Thus, it can be confirmed that after catalyst regeneration, significant loss of the main active components of the catalyst, i.e., tungsten (W), vanadium (V), and molybdenum (Mo) did not occur, but a significant number of poisons ($Na_2O$, $Fe_2O_3$, CaO, MgO, $K_2O$, $SO_3$, and $P_2O_5$) were removed.

Thus, is was confirmed that in the selective catalytic reduction (SCR) catalyst regeneration method, poisons were sufficiently removed but active substances were not removed, thus realizing excellent denitrification performance.

Figure 8:
FIG. 8 shows the appearance of a corrugated selective catalytic reduction (SCR) catalyst of a municipal waste incinerator, before regeneration.

Example 4: Regeneration of Corrugated Selective Catalytic Reduction (SCR) Catalyst of Incinerator, Poisoned with Metal Oxide Two corrugated selective catalytic reduction (SCR) catalysts (respectively designated as catalyst #1 and catalyst #2) poisoned with metal oxide, red dust, and a white crystalline material, as shown in FIG. 8, were withdrawn from the incinerator, and the catalysts were regenerated by the same method as Example 1.

Figure 9:
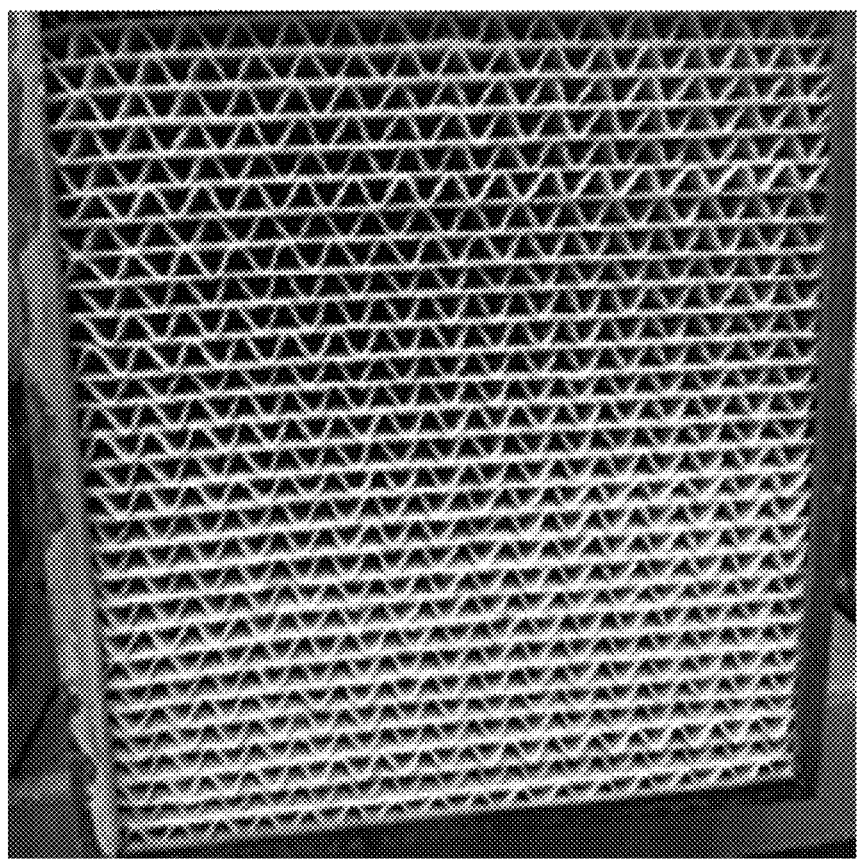
FIG. 9 shows the appearance of a corrugated selective catalytic reduction (SCR) catalyst of a municipal waste incinerator, after regeneration.

The appearances of the catalyst after the final regeneration are as shown in FIG. 9. Further, the denitrification performance test before and after catalyst regeneration was conducted under the conditions as described in Table 8, and the catalyst regeneration results are as described in Table 9.

TABLE 8

Conditions for measuring denitrification efficiency of corrugated catalyst of incinerator, poisoned with metal oxide

|  | Unit | Numerical value |
|---|---|---|
| Flow rate | $Nm^3/h$ | 155 |
| Catalyst volume | $m^3$ | 0.0247 |
| Space velocity | $h^{-1}$ | 6265 |
| Temperature | ° C. | 200~210 |

TABLE 9

Comparison of denitrification efficiencies of corrugated selective catalytic reduction (SCR) catalysts of incinerator poisoned with metal oxide, after regeneration

| Catalyst No. | Cleaned state | $NO_x$ concentration (ppm) Inlet | $NO_x$ concentration (ppm) Outlet | Denitrification efficiency (%) | $NH_3/NO_x$ ratio |
|---|---|---|---|---|---|
| New catalyst | — | 100 | 48 | 52.0 | 0.55 |
| catalyst #1 | Before cleaning | 235.42 | 199.50 | 15.22 | 0.80 |
|  | After cleaning | 204.06 | 102.98 | 49.53 | 0.55 |
| catalyst #2 | Before cleaning | 239.44 | 201.96 | 15.66 | 0.80 |
|  | After cleaning | 204.06 | 106.64 | 47.74 | 0.55 |

As shown in Table 9, the denitrification efficiency before catalyst regeneration was as low as about 15%. However, the denitrification efficiency of the regenerated catalysts were 49.53% and 47.74%, respectively, and the mean value was 48.7%, and thus the catalyst was regenerated by about 94%, based on 52%, which is the denitrification efficiency of a new catalyst.

Example 5: Real Time Regeneration of Selective Catalytic Reduction (SCR) Catalyst During Operation of Boiler or Incinerator In denitrification facilities installed in a boiler or an incinerator where coal, heavy oil, etc. is combusted, as shown in FIG. 2, high temperature steam and dry ice fine particle spray devices, and a controller that is constructed so as to detect a predetermined ammonia slip amount and automatically operate the spray devices corresponding thereto, were installed, and the catalyst was regenerated.

Example 6: Real Time Regeneration of Catalyst During Operation of Denitrification Facilities of Marine Engine In a reactor of marine denitrification facilities, high temperature steam and dry ice fine particle spray devices, and a controller that is constructed so as to detect a predetermined ammonia slip amount or pressure drop in the catalyst layer and automatically operate the spray devices corresponding thereto, were installed, and the catalyst was regenerated.

Example 7: Regeneration of Oxidation Catalyst

In an oxidation catalyst reactor, high temperature steam and dry ice fine particle spray devices, and a controller that is constructed so as to detect a predetermined pressure drop in the catalyst layer and automatically operate the spray devices corresponding thereto, were installed, and the catalyst was regenerated.

Example 8: Regeneration of Desulfurization Catalyst of Petrochemical Facilities Chromium-alumina desulfurization catalysts (Samples 1 to 4) that were used for desulfurization of a petrochemical process and discarded due to performance deterioration were regenerated by the same method as Example 1.

These catalysts were maintained under a 400° C., 500 ppm $SO_2$ atmosphere for 15 min, and then desulfurization efficiencies of a new catalyst and the catalysts after regeneration were measured, and the results are described in the following Table 10.

TABLE 10

Comparison of desulfurization efficiencies of new catalyst and regenerated catalysts of chromium-alumina desulfurization catalysts used during a petrochemical process

|  | $SO_x$ concentration (ppm) Inlet | $SO_x$ concentration (ppm) Outlet | Desulfurization efficiency (%) | Comparison of desulfurization efficiencies (%) (based on new catalyst) |
|---|---|---|---|---|
| New catalyst | 511 | 29 | 94.32 | 100 |
| Regenerated catalyst (Sample 1) | 518 | 60 | 88.42 | 93.7 |
| Regenerated catalyst (Sample 2) | 506 | 39 | 92.29 | 97.9 |
| Regenerated catalyst (Sample 3) | 518 | 78 | 84.94 | 90.1 |
| Regenerated catalyst (Sample 4) | 503 | 8 | 98.41 | 104.3 |

As shown in Table 10, it was confirmed that the desulfurization efficiencies of the regenerated catalysts were 84.94% to 98.41%, which were measured to be 90.1% to 104.3% of the desulfurization efficiency of a new catalyst, and thus they exhibited excellent regeneration efficiencies similar to a new catalyst.

Comparative Example: Catalyst Regeneration Method

Comparative Example 1

A catalyst was regenerated by the same method as Example 1, except that high temperature steam of about 200° C. was not sprayed.

TABLE 11

Denitrification efficiency change before/after regeneration of honeycomb-shaped catalyst poisoned with dust and ammonium sulfate

| | | $NO_x$ concentration (ppm) | | $NH_3$ Slip amount (ppm) | $O_2$ concentration (%) | Denitrification efficiency (%) |
|---|---|---|---|---|---|---|
| | | Inlet | Outlet | | | |
| | New catalyst | 293.1 | 33.0 | 2 | 17.91 | 88.7 |
| Catalyst regeneration | Before | 249.7 | 210.7 | 2 | 17.5 | 15.6 |
| | After primary regeneration | 240.9 | 196.0 | 2 | 17.3 | 18.6 |
| | After secondary regeneration | 253.0 | 189.6 | 3 | 17.3 | 25.1 |

As shown in Table 1, when the catalyst was regenerated without spraying high temperature steam, the denitrification efficiency of the regenerated catalyst was 18.6% to 25.1%. Considering that in Table 2, when the catalyst was regenerated while spraying high temperature steam, the denitrification efficiency of the regenerated catalyst was 88.4%, it is confirmed that catalyst regeneration efficiency is improved by combined cleaning wherein high temperature steam is also sprayed.

What is claimed is:

1. A method for regenerating a catalyst, comprising:
   spraying steam to a spent catalyst; and
   spraying dry ice particles to the spent catalyst,
   wherein the surface temperature of the spent catalyst is 25° C. to 50° C.,
   wherein the temperature of the steam is 100° C. to 500° C.,
   wherein the amount of the sprayed steam is 300 cc/min to 1200 cc/min,
   wherein in the spraying of steam to the spent catalyst, a liquid material is dispersed on the surface of the spent catalyst,
   wherein in the spraying of dry ice particles to the spent catalyst, the liquid material dispersed on the surface of the spent catalyst is frozen, and the dry ice particles are ground,
   wherein, when the liquid material dispersed on the surface of the spent catalyst is frozen, cracks are formed in the poison included in the spent catalyst,
   wherein a decrease rate of the weight ratio of a poison to active components in the catalyst before and after the regeneration, according to the following Equation 1, is 30% to 90%;

Decrease rate of the weight ratio of poison to the active components in the catalyst before and after regeneration (%)=(the weight ratio of poison to active components before regeneration−the weight ratio of poison to active components after regeneration)/the weight ratio of poison to active components before regeneration*100,  [Equation1]

wherein the spent catalyst comprises a selective catalytic reduction (SCR) catalyst.

2. The method for regenerating a catalyst according to claim 1, wherein the steam or dry ice particles are sprayed at a front end of the spent catalyst.

3. The method for regenerating a catalyst according to claim 1, wherein the sprayed steam or dry ice particles contact 70% or more of the surface of the spent catalyst.

4. The method for regenerating a catalyst according to claim 1, wherein the liquid material comprises a liquefied product of steam or a poison to which steam is adsorbed.

5. The method for regenerating a catalyst according to claim 1, wherein a mean particle diameter of the cracks is 0.1 μm to 50 μm.

6. The method for regenerating a catalyst according to claim 1, wherein in the spraying of dry ice particles to the spent catalyst, fine dry ice particles with a particle diameter of 0.1 μm to 100 μm are formed.

7. The method for regenerating a catalyst according to claim 1, further comprising removing a poison included in the spent catalyst, after the spraying of dry ice particles to the spent catalyst.

8. The method for regenerating a catalyst according to claim 7, wherein the removing of the poison included in the spent catalyst comprises penetrating dry ice particles into the poison, and sublimating the dry ice particles.

9. The method for regenerating a catalyst according to claim 1, wherein the spraying of steam to the spent catalyst and the spraying of dry ice particles to the spent catalyst are simultaneously or sequentially performed.

10. The method for regenerating a catalyst according to claim 1, further comprising detecting the degree of poisoning in real time and controlling the amount of spray, before the spraying of steam to the spent catalyst.

11. The method for regenerating a catalyst according to claim 1, wherein the spraying of dry ice particles to the spent catalyst further comprises spraying ice with a particle diameter of 0.1 mm to 5 mm.

12. The method for regenerating a catalyst according to claim 11, wherein the ice is sprayed at a speed of 200 m/s to 400 m/s.

* * * * *